(No Model.)
J. S. SACKETT.
SEWING MACHINE ATTACHMENT.
No. 284,069. Patented Aug. 28, 1883.
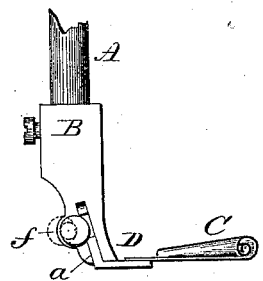
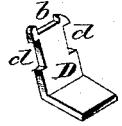
Witnesses
J. N. Shumway
Jos. C. Earle
Joseph S. Sackett
Inventor
By Atty.
John C. Earle

UNITED STATES PATENT OFFICE.

JOSEPH S. SACKETT, OF NEW HAVEN, CONNECTICUT, ASSIGNOR OF ONE-HALF TO JANE HALLIWELL, OF SAME PLACE.

SEWING-MACHINE ATTACHMENT.

SPECIFICATION forming part of Letters Patent No. 284,069, dated August 28, 1883.

Application filed May 22, 1883. (No model.)

*To all whom it may concern:*

Be it known that I, JOSEPH S. SACKETT, of New Haven, in the county of New Haven and State of Connecticut, have invented a new Improvement in Sewing-Machine Attachments; and I do hereby declare the following, when taken in connection with the accompanying drawings and the letters of reference marked thereon, to be a full, clear, and exact description of the same, and which said drawings constitute part of this specification, and represent, in—

Figure 1, a side view; Fig. 2, a front view; Fig. 3, a perspective view of the eccentric-shaft detached; Fig. 4, a perspective view of the attachment.

This invention relates to an improvement in securing attachments to sewing-machines, such as hemmers, fellers, binders, rufflers, &c. Usually these attachments have been secured to the presser-foot.

The object of my invention is to construct the presser-foot shank and foot so as to be separated from each other, and so that other attachments may be introduced to the shank in place of the presser-foot—that is, interchangeable therewith; and the invention consists in constructing the presser-foot shank with a transverse and substantially vertical slot, and the attachments with an arm corresponding to said slot, the said arm constructed to interlock with the shank, so as to locate the attachment in proper position, combined with an interlocking device which will secure the attachment in the shank, as more fully hereinafter described.

A represents the presser-foot rod or spindle, and B the shank, which is attached to the rod in the usual manner, and down to the lower end substantially in the usual shape.

Transversely across the lower end of the shank is a slot, *a*, extending upward nearly vertical, but preferably inclined. By "transverse" I mean at right angles to the line of the feed. The attachment represented is that of a hemmer, C, upon the forward end of which is an arm, D, extending upward and corresponding to the slot *a* in the shank. At the upper end of the arm a notch, *b*, is formed to set onto the body of the shank, each side of the notch extending, respectively, up onto the sides of the shank, as seen in Fig. 2, which locates the attachment in the presser-foot. The arm D is somewhat wider than the slotted portion of the shank, and in each edge of the arm is a notch, *d*, (see Fig. 4,) the part of the arm within the notch being in width substantially that of the shank.

On the back of the shank is a transverse shaft, *e*, carrying at each end an eccentric-head, *f*. This shaft is arranged in a bearing on the back of the shank, as indicated in Fig. 1, and so that the eccentrics turned forward will enter the notches *d* in the arm D, as seen in Figs. 1 and 2, and so as to bear against the upper edge of the notches *d* and hold the attachment securely in the shank.

To remove the attachment, turn the eccentrics backward and away from the notches, as seen in broken lines, Fig. 1. Then the attachment may be easily withdrawn and another introduced.

The presser-foot itself, like all attachments, is constructed with an arm like the arm D, and so as to be introduced and locked in place, as described. This construction permits the passage of the arm D into its slot from one side, so that no more than the usual rise of the presser-foot is necessary for the introduction of the attachment and no occasion to take the shank from the spindle.

While I prefer the eccentrics *f* as means for securing the attachment in place, a set-screw may be introduced from the front or back side of the shank to bear upon the arm. While I prefer the notch *b*, as it serves to correctly locate the attachment before the securing devices are applied, it may be dispensed with, the eccentrics relied upon to embrace the opposite sides of the arm, and thereby locate the attachment.

From the foregoing it will be understood that by "attachment" I include the presser-foot alone and all devices which are usually applied or secured to the presser-foot.

I claim—

1. The combination of the shank B, constructed with the transverse slot *a* at its lower end, the attachment constructed with an arm, D, corresponding to said slot, and with a notch, $b$, in its upper end to embrace the shank at the upper end of the slot, and a device, substantially such as described, to secure the arm in place, substantially as described.

2. The combination of the shank B, constructed with the transverse slot $a$ at its lower end, the attachment constructed with an arm, D, corresponding to said slot, with a notch, $d$, upon opposite sides, and eccentric-heads $f$ upon a shaft, $e$, arranged transversely across the shank, to engage said notches $d$ when the attachment is in place, substantially as described.

JOSEPH S. SACKETT.

Witnesses:
JOHN E. EARLE,
JOS. C. EARLE.